United States Patent Office 2,771,402
Patented Nov. 20, 1956

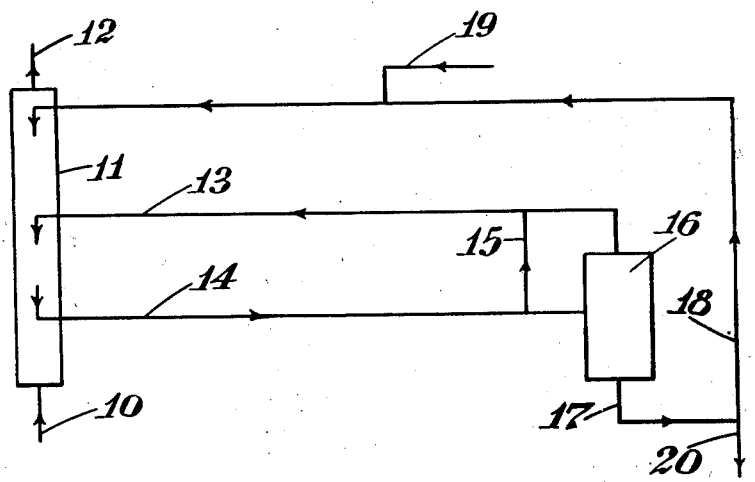
INVENTORS
STANLEY FRANCIS BIRCH
THOMAS VERNON CULLUM
RONALD ALFRED DEAN
BY
ATTORNEYS

2,771,402

HYPOCHLORITE PROCESS FOR THE TREATMENT OF PETROLEUM DISTILLATES

Stanley Francis Birch, Thomas Vernon Cullum, and Ronald Alfred Dean, Sunbury-on-Thames, England, assignors to The British Petroleum Company Limited Application May 13, 1953, Serial No. 354,686

Claims priority, application Great Britain May 14, 1952

6 Claims. (Cl. 196—29)

The hypochlorite process for the treatment of petroleum distillates, such as naphthas and kerosines, has been well-known for a considerable time. The process may be used to effect either sweetening or desulphurisation depending upon the content of free alkali in the hypochlorite solution and the amount of available chlorine present. The process has the advantages that it uses cheap materials, lends itself to continuous operation and presents no serious problem of effluent disposal. A disadvantage of the process is that the treated product may contain sulphonyl chlorides which slowly hydrolyse on standing to give the product an acid character, known generally as "pseudoacidity." The development of this pseudoacidity can be substantially reduced by extensive washing with alkali (caustic soda or lime water) in order to hydrolyse the sulphonyl chlorides, and when the hypochlorite solution contains a large excess of free alkali, this washing is very effective. However, the washing operation involves prolonged and intimate mixing.

The principal object of the present invention is to prevent the development of pseudoacidity in hypochlorite-treated products without the necessity for such prolonged and intimate mixing as has hitherto been considered necessary.

According to the invention, a petroleum distillate which has been treated with hypochlorite solution is contacted with a mixture of methanol and an aqueous caustic alkali solution.

It has been found that such subsequent treatment of the hypochlorite-treated distillate is very effective in removing the acid chlorides responsible for the pseudoacidity, while when treating some high-boiling naphthas it materially assists desulphurisation by extraction of the oil soluble sulphones resulting from the oxidation of thioethers.

According to a further feature of the invention, the hypochlorite-treated distillate is contacted counter-currently first with a mixture of methanol and an aqueous caustic alkali solution and then with caustic alkali solution alone, thus removing any alcohol that may have become dissolved in the distillate.

The recovery of methanol from aqueous solution by distillation is an easy operation since no azeotropes are formed so that the recovery and recycle of the methanol in the aqueous caustic alkali solution presents no difficulty.

The strength of the aqueous caustic alkali solution may vary between 0.5% and 50% w./w. being preferably of the order of 5–30% w./w. The ratio of caustic alkali to methanol and distillate to be treated is adjusted in accordance with the strength of the caustic alkali and the acidity of the product.

The process may be carried out batchwise or continuously.

The process may be applied to petroleum distillates boiling up to the end of the gas oil boiling range.

The process may advantageously be carried out as illustrated in the accompanying diagram.

The hypochlorite-treated distillate is passed via line 10 to a column 11 which it leaves via line 12. Methanol, or a mixture of methanol and an aqueous caustic alkali solution, enters the column via line 13 and leaves via line 14 from which it may be recycled via line 15 or may be passed to distillation column 16 from which methanol is passed to line 13 and caustic solution is removed via line 17. The caustic solution is passed via line 18 to the top of the column 11, fresh caustic being added via line 19, and spent caustic removed via line 20. The column 11 is provided with a suitable packing to effect intimate contact between the distillate and the treating solution.

The invention will now be described with reference to the following examples.

Example I

A blend of 1-octanesulphonyl chloride in kerosine was prepared to give an acidity of 3.10 ml. of 0.05 N caustic soda per 100 ml. kerosine. On treatment with 0.95% v./v. of 30% w./w. caustic soda solution and 0.64% v./v. methanol, the kerosine had no measurable acidity.

Example II

A sample of straight-run kerosine (1500 ml) treated with excess calcium hypochlorite solution (500 ml. of 0.37 N available chlorine containing free calcium hydroxide to give an alkalinity of 0.04 N) was rendered "doctor" negative but had a high acidity. After treatment with 2.2% v./v. of 30% w./w. caustic soda solution and 0.83% v./v. methanol the acidity was reduced practically to zero. The acidity, sulphur content and chlorine content of the sample before and after treatment are summarised as follows:

|  | Acidity | Total Sulphur, Percent w./w. | Mercaptan Sulphur, Percent w./w. | Total Chlorine |
|---|---|---|---|---|
| Before Treatment | Nil | 0.394 | 0.015 | 0.0060 |
| After Treatment [a] | 5.0 ml | 0.355 | Nil | 0.0123 |
| After Treatment [b] | Below 0.1 ml | 0.353 | Nil | 0.0098 |

[a] Product after hypochlorite treatment.
[b] After treatment of product made ([a]) with methanol and caustic soda as described above.

Example III

A sample of straight-run naphtha (1500 ml.) was treated with excess calcium hypochlorite solution (500 ml. of 0.356 N available chlorine containing free calcium hydroxide to give an alkalinity of 0.04 N). The product was "doctor" negative and had a high acidity. After treatment with 2.2% v./v. of 30% w./w. caustic soda solution and 0.72% v./v. methanol the acidity was reduced practically to zero. The acidity and sulphur content of the sample before and after treatment are summarised as follows:

|  | Acidity | Total Sulphur, Percent w./w. | Mercaptan Sulphur, Percent w./w. |
|---|---|---|---|
| Before Treatment | Nil | 0.085 | 0.014 |
| After Treatment [a] | 3.8 ml | 0.042 | Nil |
| After Treatment [b] | Below 0.1 ml | 0.042 | Nil |

[a] Product after hypochlorite treatment.
[b] After treatment of product from ([a]) with methanol and caustic soda as described above.

Example IV

A sample of cracked naphtha (1500 ml.) treated with calcium hypochlorite solution (500 ml. of 0.356 N available chlorine containing free calcium hydroxide to give an alkalinity of 0.04 N) was rendered "doctor" negative but had an acidity. After treatment with 2.6% v./v. of 30% w./w. caustic soda solution and 0.9% v./v. methanol the product had a zero acidity.

The acidity, bromine number and total sulphur of the cracked naphtha before and after treatment are summarised below:

|  | Acidity | Total Sulphur, Percent w./w. | Mercaptan Sulphur, Percent w./w. | Bromine Number |
|---|---|---|---|---|
| Before Treatment | Nil | 0.860 | 0.13 | 13.8 |
| After Treatment [a] | 0.5 ml. | 0.860 | Nil | 12.2 |
| After Treatment [b] | Nil | 0.797 | Nil | 12.1 |

[a] Product after hypochlorite treatment.
[b] After treatment of product from ([a]) with methanol and caustic soda as described above.

Example V

A sample of gas oil (1500 ml.) treated with calcium hypochlorite solution (1500 ml. of 0.451 N available chlorine containing free calcium hypochlorite to give an alkalinity of 0.043 N) was rendered doctor negative but had an acidity. After treatment with 1.76 percent v./v. of 30 percent w./w. caustic soda solution and 2.44 percent v./v. methanol the product had much lower acidity. The acidity, sulphur content and chlorine content of the sample before and after treatment are summarised as follows:

|  | Acidity | Total Sulphur, Percent w./w. | Mercaptan Sulphur, Percent w./w. | Total Chlorine, Percent w./w. |
|---|---|---|---|---|
| Before Treatment | Nil | 0.85 | 0.022 | 0.0016 |
| After Treatment [a] | 4.11 | 0.80 | Nil | 0.035 |
| After Treatment [b] | 0.40 | 0.78 | Nil | 0.025 |

[a] Product after hypochlorite treatment.
[b] After treatment of product from ([a]) with methanol and caustic soda as described above.

Example VI

A sample of gas oil (1500 ml.) treated with calcium hypochlorite solution (1500 ml. of 0.451 N available chlorine containing free calcium hydroxide to give an alkalinity of 0.43 N) was rendered doctor negative but had an acidity. After treatment with 3.2 percent v./v. of 30 percent w./w. caustic soda solution and 2.7 percent v./v. methanol the product had much lower acidity. The acidity, sulphur content and chlorine content of the sample before and after treatment are summarised as follows:

|  | Acidity | Total Sulphur, Percent w./w. | Mercaptan Sulphur, Percent w./w. | Total Chlorine, Percent w./w. |
|---|---|---|---|---|
| Before Treatment | Nil | 0.65 | 0.012 | 0.0012 |
| After Treatment [a] | 5.38 | 0.60 | Nil | 0.036 |
| After Treatment [b] | 0.10 | 0.58 | Nil | 0.065 |

[a] Product after hypochlorite treatment.
[b] After treatment of product from ([a]) with methanol and caustic soda as described above.

We claim:

1. A process for the treatment of a petroleum distillate boiling up to the end of the gas oil range, comprising treating the distillate with a hypochlorite solution, contacting the treated distillate countercurrently with a mixture consisting essentially of methanol and a caustic alkali solution, said caustic alkali solution having a strength of between 0.5% and 50% w./w., and then treating the distillate with caustic alkali solution alone.

2. The process according to claim 1, wherein the strength of the caustic alkali solution is between 5% and 30% w./w.

3. A process according to claim 1, wherein the petroleum distillate is a straight-run naphtha.

4. A process according to claim 1, wherein the petroleum distillate is a cracked naphtha.

5. A process according to claim 1, wherein the petroleum distillate is a kerosine.

6. A process according to claim 1, wherein the petroleum distillate is a gas oil.

References Cited in the file of this patent

UNITED STATES PATENTS 1,796,621    Ramage _____ Mar. 17, 1931